United States Patent [19]

Sien

[11] 3,907,356

[45] Sept. 23, 1975

[54] MINE VEHICLE AND METHOD OF FABRICATION

[75] Inventor: Gerald Bruce Sien, Carlsbad, N. Mex.

[73] Assignee: Sien Equipment Company, Carlsbad, N. Mex.

[22] Filed: Feb. 22, 1973

[21] Appl. No.: 334,769

[52] U.S. Cl. ............... 296/28 F; 29/482; 52/758 B; 280/106 R; 280/106 T; 296/29
[51] Int. Cl.²......................................... B62D 27/00
[58] Field of Search ................... 296/28 F, 28 J, 29; 280/106 R, 106 T, 154.5 R, 160, 152, 153; 180/68 P; 52/666, 667, 669, 421, 758 B, 758 A, 758 H; 29/155 R, 482

[56] References Cited
UNITED STATES PATENTS

| | | | |
|---|---|---|---|
| 1,229,124 | 6/1917 | Nelson | 280/152 B |
| 1,848,895 | 3/1932 | MacPherson | 280/106 R |
| 2,027,898 | 1/1936 | Broulhiet | 280/106 R |
| 2,050,609 | 8/1936 | Howell | 52/421 |
| 2,099,789 | 11/1937 | Baker | 180/68 P |
| 2,854,086 | 9/1958 | Schmidt | 180/68 P |
| 3,100,653 | 8/1963 | Ibaugh et al. | 280/106 T |
| 3,300,231 | 1/1967 | Luli et al. | 280/106 R |
| 3,338,618 | 8/1967 | Fritz | 52/667 |
| 3,623,744 | 11/1971 | Bertness et al. | 280/106 R |

*Primary Examiner*—Robert J. Spar
*Assistant Examiner*—Donald W. Underwood
*Attorney, Agent, or Firm*—Richards, Harris & Medlock

[57] ABSTRACT

A mine vehicle includes a pair of spaced apart, longitudinally disposed rectangular tubular members which extend the entire length of the vehicle. The rectangular tubular members are interconnected by at least two spaced apart, transversely disposed beams. The rectangular members are received in generally C-shaped notches formed in the ends of the beams and are joined to the beams by welding, thereby defining the frame of the vehicle.

The rectangular tubular members of the frame extend between at least two wheels which support at least a portion of the vehicle. The vehicle may be provided with fenders extending outwardly from the rectangular tubular members of the frame over the wheels. A grille assembly is provided at the front end of the frame and comprises a pair of channel members extending vertically upwardly from the rectangular tubular members of the frame, a channel member extending transversely between the upper ends of the vertically extending channel members, and a pair of brace members each extending angularly downwardly between one of the vertically extending channel members and the aligned rectangular tubular member of the frame.

1 Claim, 1 Drawing Figure

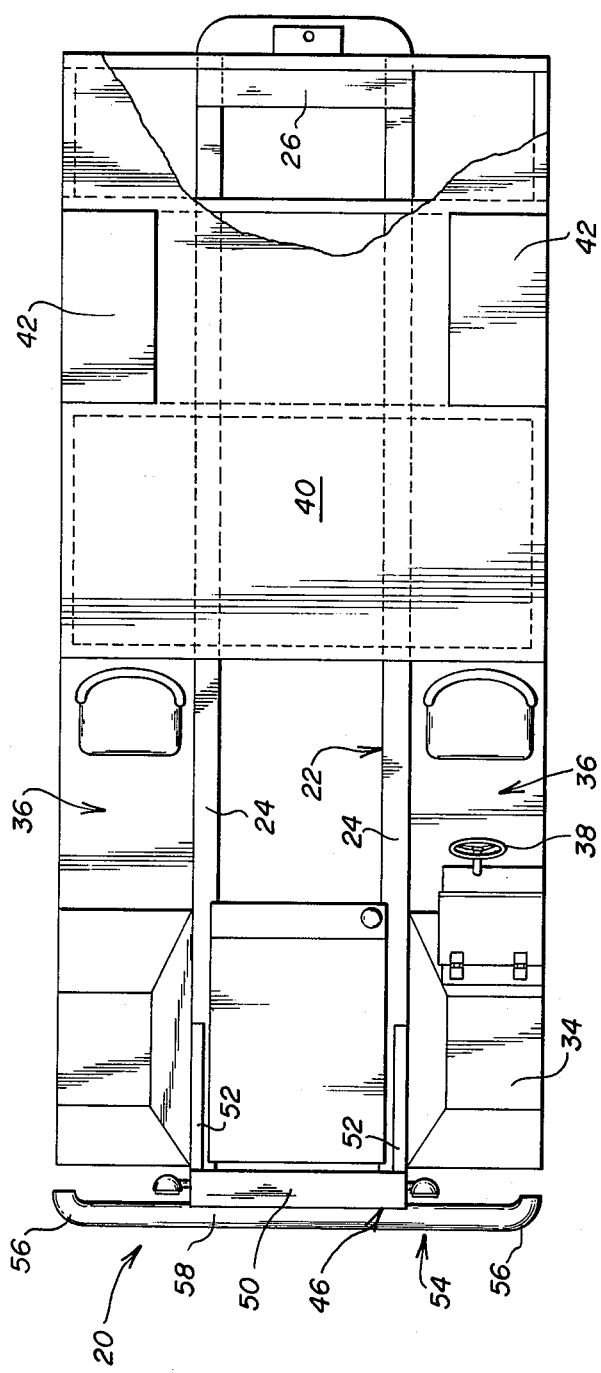
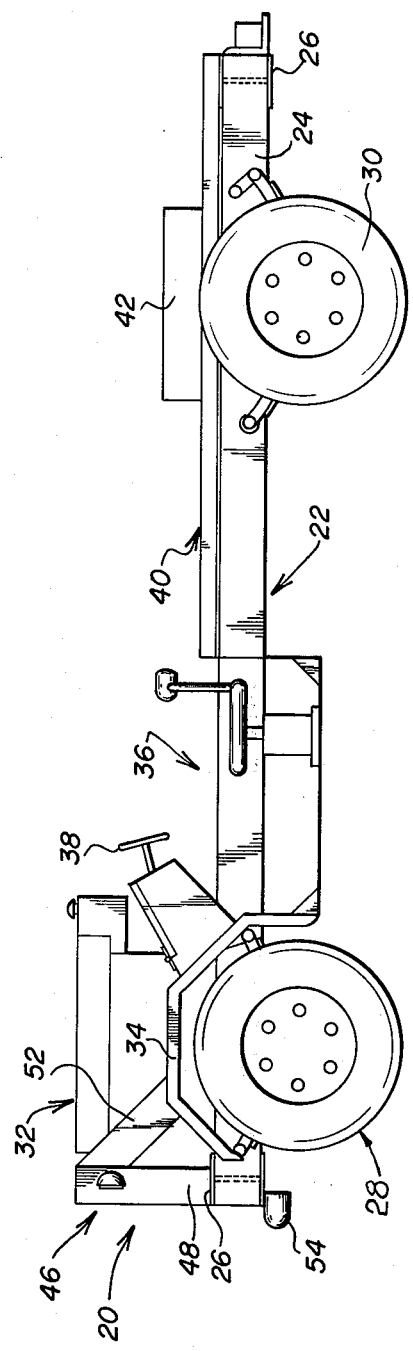
Figure 2
Figure 1

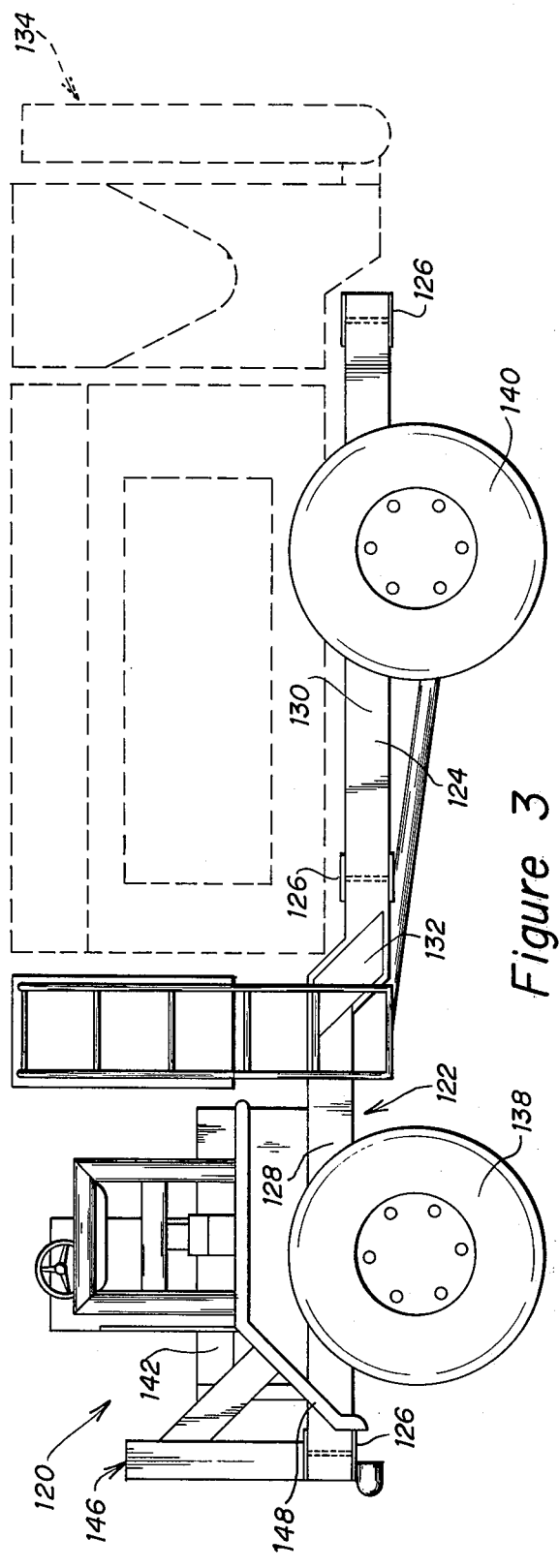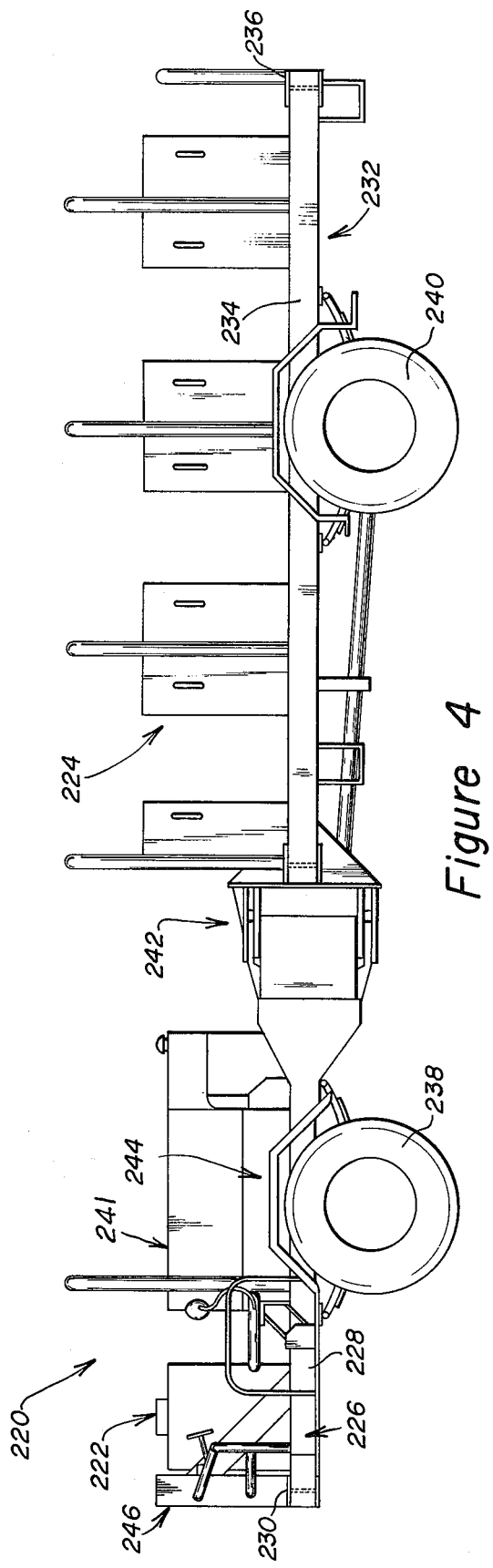

MINE VEHICLE AND METHOD OF FABRICATION

BACKGROUND AND SUMMARY OF THE INVENTION

This invention relates to a mine vehicle and method of fabrication, and more particularly to a vehicular frame construction which is particularly suited for use in mine vehicles and similar heavy duty applications.

It is now well established that vehicles intended for use in mines must be adapted to withstand extremely vigorous operational conditions. This is true for a number of reasons. First, mine vehicles are frequently subjected to 24 hour duty cycles wherein little if any time is reserved for routine maintenance and servicing operations. Second, due to the very nature of mining operations, it is often difficult either to bring a mine vehicle to a servicing location or to transport maintenance equipment to the location of the vehicle. This fact often results in less than adequate servicing of the vehicle even in those instances in which sufficient time is provided in the duty cycle to permit such operations. Third, in many instances a mine is formed by removing successive layers from the mine face. This results in a series of steps or ridges formed in the mine floor, which in turn subject mine vehicles to substantially continuous vibration and shock loads as they are operated across the mine floor.

The present invention comprises a mine vehicle and method of fabrication which takes into account the foregoing considerations in order to provide an extremely heavy duty vehicular construction. In accordance with the broader aspects of the invention, there is provided a pair of spaced apart, longitudinally extending structural members which extend substantially the entire length of a mine vehicle. The structural members are interconnected by transversely extending beams which are connected to the structural members by means of welding. This provides a vehicular frame construction which is particularly adapted to withstand both bending and torsion stress, and which is not readily damaged due to substantially continuous vibration and shock loads.

In accordance with more specific aspects of the invention, the structural members comprise rectangular tubular members and the transversely extending beams comprise wide flanges. Each beam includes a web extending between upper and lower flanges having inner surfaces which are spaced apart by a distance equal to the overall height of the rectangular tubular members. The ends of the webs of each beam are removed to such an extent that the flanges extend beyond each end of the web by a distance equal to the width of the rectangular tubular members. This provides a generally C-shaped notch at each end of each beam which receives and securely clamps the adjacent rectangular tubular members, thereby significantly adding to the strength of the frame.

In accordance with still other aspects of the invention the front end of the mine vehicle is provided with a grille assembly comprising a pair of channel members each extending vertically from one of the rectangular tubular members of the frame, a channel member extending transversely between the upper ends of the vertical channel members, and brace members each extending angularly downwardly from one of the vertical channel members to the underlying rectangular tubular member. A heavy duty bumper extends across the entire width of the vehicle and fenders may be provided for partially enclosing front wheels of the vehicle. This heavy duty grille-bumper-fender construction is particularly advantageous in mine vehicles and the like in that it permits the vehicle to withstand relatively severe collisions and other impacts without necessitating repair.

DESCRIPTION OF THE DRAWINGS

A more complete understanding of the invention may be had by referring to the following Detailed Description when taken in conjunction with the accompanying Drawings, wherein:

FIG. 1 is a side view of a first mine vehicle incorporating the invention;

FIG. 2 is a top view of the vehicle shown in FIG. 1;

FIG. 3 is a side view of a second mine vehicle incorporating the invention;

FIG. 4 is a side view of a third mine vehicle incorporating the invention;

DETAILED DESCRIPTION

Figure 5:
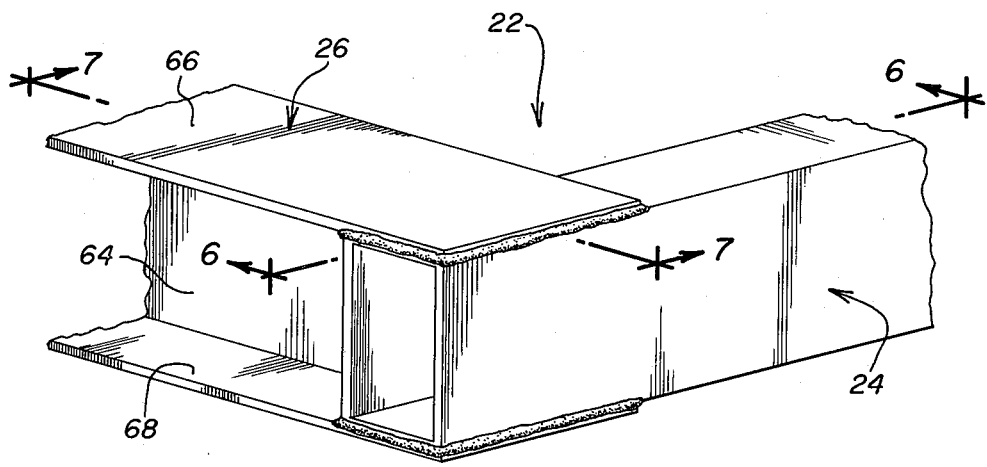
FIG. 5 is a perspective view illustrating a method of the vehicular construction.

Referring now to the Drawings, and particularly to FIGS. 1 and 2 thereof, there is shown a first mine vehicle 20 incorporating the invention. The mine vehicle 20 includes a frame 22 comprising a pair of spaced apart, longitudinally disposed rectangular tubular members 24 each extending substantially the entire length of the vehicle 20. The rectangular tubular members 24 are interconnected by spaced apart, transversely disposed beams 26. It will be understood that whereas the particular vehicle illustrated in FIGS. 1 and 2 comprises only two beams 26, in certain applications it will be advantageous to provide additional beams 26 depending on the overall length of the vehicle.

The frame 22 of the vehicle 20 is supported for movement over a surface by four wheels, including two steerable front wheels 28 and two non-steerable rear drive wheels 30. The front wheels 28 may also be driven, if desired. Operating power for the vehicle 20 is provided by an engine 32 supported on the frame 22 directly over the front wheels 28. In accordance with the preferred embodiment of the invention, the engine 32 comprises a diesel engine suitably modified such that it is adapted for use within mines.

As is best shown in FIG. 1, the rectangular tubular members 24 are situated between the wheels of the mine vehicle 20. The front end of the vehicle 20 is provided with a pair of fenders 34 which are secured to the rectangular tubular members 24, and which extend outwardly therefrom over the front wheels 28. The fenders 34 therefore serve to at least partially enclose the front wheels of the vehicle. A pair of compartments 36 are provided on the opposite sides of the vehicle behind the fenders 34 and adjacent to the rectangular tubular members 24. One of the compartments 36 comprises an operator's compartment in that it is equipped with a steering wheel 38 and other apparatus suitable for controlling the various functions of the vehicle 20.

A bed 40 is supported on the frame 22 of the vehicle 20 just behind the compartments 36. The particular bed 40 illustrated in FIGS. 1 and 2 is of the flat bed variety and includes a pair of box-shaped fenders 42 which enclose the upper portions of the rear wheels 30. It will be understood, however, that the vehicle 20 may be equipped with other types of beds, if desired. Moreover, apparatus of various types, such as cranes, cherry pickers, etc. may be mounted on the rear portion of the frame 22 of the vehicle 20, if desired.

The front end of the mine vehicle 20 is equipped with a grille assembly 46. The grille assembly 46 includes a pair of channel members 48 each secured to and extending vertically upwardly from one of the rectangular tubular members 24 of the frame 22. A transversely disposed channel member 50 is secured to and extends between the upper ends of the vertically extending channel members 48. A pair of angularly extending brace members 52 are provided, each secured at its upper end to one of the vertically extending channel members 48 and at its lower end to the rectangular tubular member 24 extending thereunder. In accordance with the preferred embodiment of the invention, all of the component parts of the grille assembly 46 are interconnected by means of welding.

The grille assembly 46 of the mine vehicle 20 further includes a front bumper 54. As is best shown in FIG. 1, the bumper 54 preferably comprises a pipe section provided with rounded end portions 56 extending between a transversely disposed central portion 58. The bumper 54 is at least as wide as the remaining components of the vehicle 20, and therefore serves to protect both the fenders 34 and the front wheels 28 from impact damage. In this regard it will be noted that the bumper 54 is so arranged that the end portions 56 may be deformed substantially rearwardly without interfering in any way whatsoever with the operation of the vehicle 20, including the manipulation of the front steering wheels 28.

Figure 6:
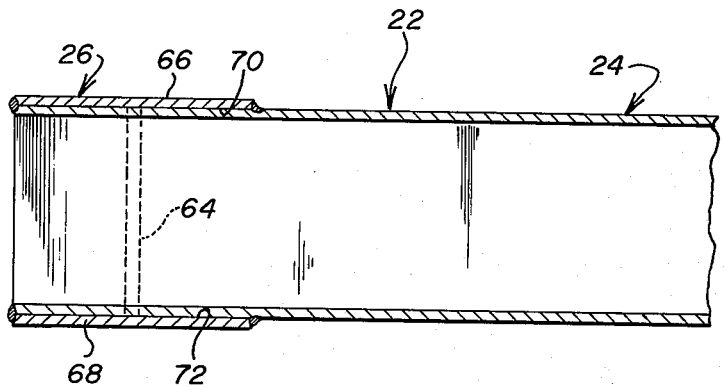
FIG. 6 is a sectional view taken generally along the lines 6—6 in FIG. 5 in the direction of the arrows.
Figure 7:
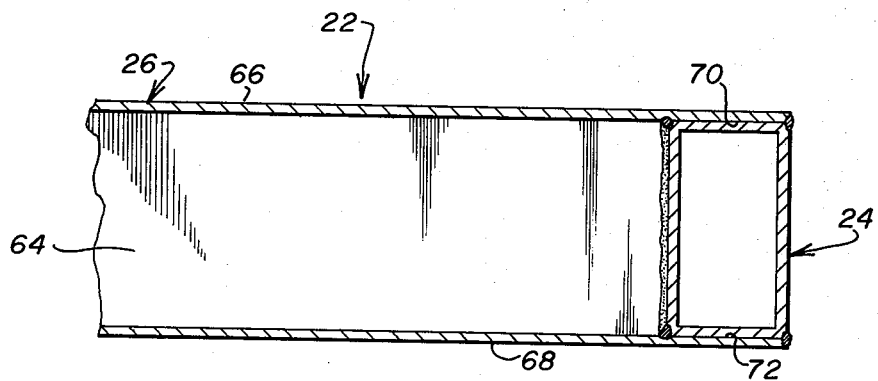
FIG. 7 is a sectional view taken generally along the lines 7—7 in FIG. 5 in the direction of the arrows.

The construction of the frame 22 of the mine vehicle 20 is illustrated in greater detail in FIGS. 5, 6 and 7. The rectangular tubular members 24 of the frame 22 have predetermined height, width and thickness dimensions. For example, the rectangular tubular members 24 may be 7 inches high by 4 inches wide, and may be fabricated from ⅜ inch steel plate. The beams 26 of the frame 22 comprise commercially available beams of the type known as wide flange beams. In those instances in which 7 inch by 4 inch rectangular tubular members 24 are employed in the frame 22, the beams 26 are preferably 8 inch wide flange beams of the type weighing 31 lbs./ft.

As is best shown in FIGS. 6 and 7, the beams 26 each comprise a web 64 extending between upper and lower flanges 66 and 68. The flanges 66 and 68 have inner surfaces 70 and 72, respectively, which are separated by a distance which is substantially identical to the height of the rectangular tubular members 24. The opposite ends of the web 64 of each beam 26 are removed to such an extent that the flanges 66 and 68 extend beyond the ends of the web 64 by a distance substantially identical to the thickness of the rectangular tubular members 24. By this means each end of each beam 26 is provided with a generally C-shaped notch adapted to receive the adjacent portion of one of the rectangular tubular members 24 of the frame 22.

In the construction of the frame 22, the rectangular tubular members 24 are positioned within the generally C-shaped notches at the ends of the beam 26. Thereafter, the rectangular tubular members 24 and the beams 26 are joined by forming both fillet and end welds formed between the adjacent portions of each beam 26 and each rectangular tubular members 24. By this means the component parts of the frame 22 are both mechanically clamped and rigidly joined one to the other, thereby providing a frame which is resistent to bending and torsion loads, and which is adapted to withstand substantially continuous shock and vibration loads of the type that are encountered during operation of a mine vehicle across a mine floor.

Figure 8:
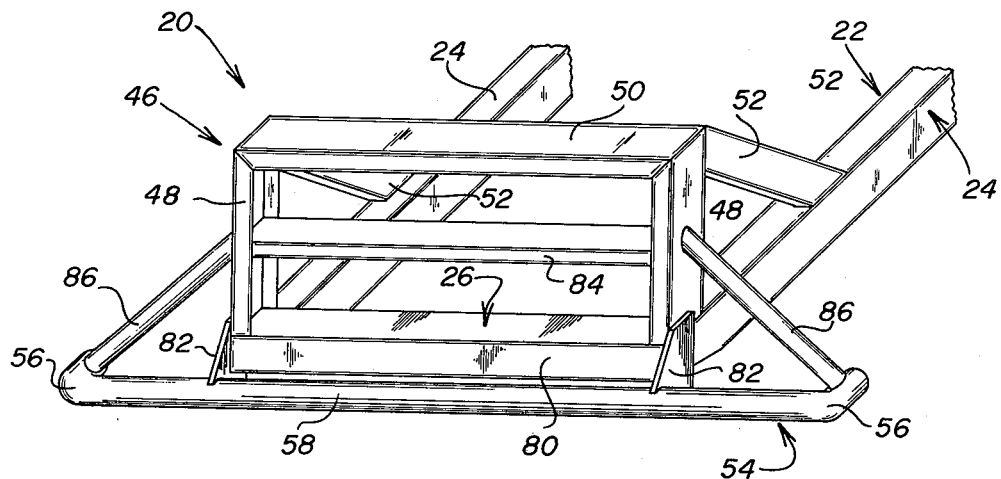
FIG. 8 is a perspective view illustrating a typical grille assembly utilized in the invention.

The construction of the frame assembly 46 of the first mine vehicle 20, and the interrelationship of the front bumper 54 and the grille assembly are further illustrated in FIG. 8. The beam 26 at the front end of the frame 22 is enclosed by a plate 80, and the bumper 54 is supported by a pair of brackets 82. These components are welded to the frame 22 so as to further reinforce the front end of the frame. The grille assembly 46 may further include a channel member 84 extending between the channel members 48 and positioned midway between the forward beam 26 and the channel member 50. The vehicle may also be provided with brace members 86 extending angularly downwardly between the channel members 48 and the end portions 56 of the front bumper 54.

Figure 9:
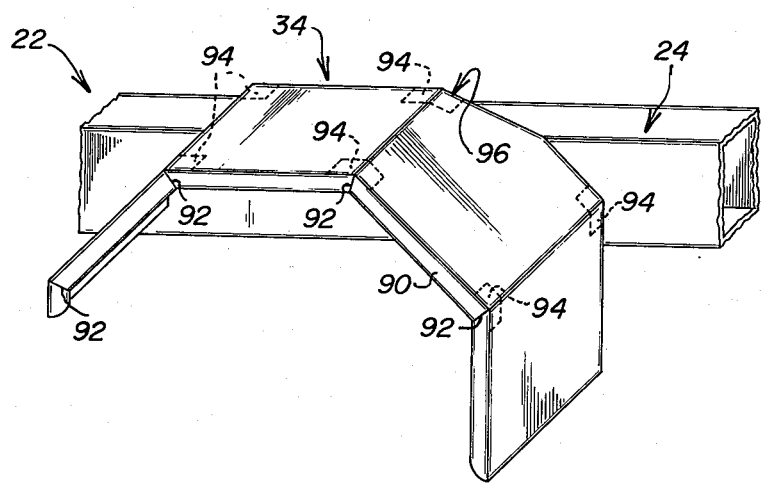
FIG. 9 is a perspective view illustrating a typical fender assembly utilized in the invention.

The construction of the fenders 34 of the vehicle 20 is shown in FIG. 9. Each fender 34 is formed from a single length of sheet metal having its edges turned inwardly to provide opposed flanges 90. Portions of the flanges 90 are removed in the conventional manner, and the length of sheet metal is then bent into the configuration illustrated in the Drawings. The ends of the flanges 90 are then welded as at 92 so that the flanges serve to reinforce the fender 34. Each corner of each fender 34 is provided with a reinforcing member 94 comprising a length of metal stock having dimensions of approximately 2 inches by 4 inches and bent into the configuration of the interior of the fender. The reinforcing members 94 are welded into the various corners of each fender 34 and therefore serve to reinforce both the main portions of the fender, the flanges 90, and the joints 92 between the various sections of the flanges. This feature of the invention is considered to be very important in preventing damage to the fender due to continuous vibration and back loads of the type encountered during operation of the vehicle in mines, etc.

The upper inside corner portion of the length of sheet metal comprising each fender 34 is removed, and a downwardly and inwardly tapered plate 96 is substituted therefor. Each fender 34 is welded to the adjacent tubular member 24 of the frame 22 with the lower edge of the plate 96 extending parallel to the upper surface of the tubular member 24. In this manner there is provided a fender construction which is not only extremely strong and rigid, but also very pleasing in appearance.

Referring now to FIG. 3, there is shown a second mine vehicle 120 incorporating the invention. The mine vehicle 120 includes a frame 122 constructed substantially as shown in FIGS. 5, 6 and 7. Thus, the frame 122 includes a pair of spaced apart, longitudinally disposed rectangular tubular members 124 each extending substantially the entire length of the vehicle. The rectangular members 124 are interconnected by three beams 126.

One difference between the mine vehicle 120 and the vehicle 20 shown in FIGS. 1 and 2 relates to the fact that the frame 122 of the vehicle 120 includes a front portion 128 and a rear portion 130 extending parallel to each other but at different vertical levels. The portions 128 and 130 of the frame 122 are interconnected by an angularly extending portion 132. By this means the rear portion 130 of the frame 122 is adapted to support various apparatus 134 which might otherwise extend too high to permit use of the vehicle 120 in mines.

The vehicle 120 includes a pair of steerable front wheels 138 and a pair of non-steerable rear drive wheels 140. Operating power for the vehicle is provided by an engine 142 which is supported on the front portion 128 of the frame 122 directly over the front wheels 138. The vehicle 120 is further provided with a grille assembly 146 which is identical in all material respects to the grille assembly 46 of the vehicle 20, and with a pair of fenders 148 which are constructed and mounted substantially identically to the fenders 34 of the vehicle 20.

A third mine vehicle 220 incorporating the invention is illustrated in FIG. 4. The vehicle 220 differs substantially from the vehicles 20 and 120 in that it comprises an articulated frame vehicle. That is, the vehicle 220 comprises a forward tractor portion 222 and a rearward trailer portion 224.

The tractor portion 222 of the vehicle 220 comprises a frame 226 including a pair of spaced apart, longitudinally disposed rectangular tubular members 228 which are interconnected by spaced apart, transversely disposed beams 230. Similarly, the trailer portion 224 of the vehicle 220 comprises a frame 232 including a pair of spaced apart, longitudinally disposed rectangular tubular members 234 which are interconnected by spaced apart, transversely disposed beams 236. Both the frame 226 and the frame 232 of the vehicle 220 are constructed substantially as shown in FIGS. 5, 6 and 7.

The tractor portion 222 of the vehicle 220 is supported on a pair of wheels 238, and the trailer portion 224 is supported on a pair of wheels 240. An engine 241 is mounted on the tractor portion 222 directly over the front wheels 238 and functions to propel the vehicle 220 by means of both the front wheels 238 and the rear wheels 240. The vehicle 220 is steered by means of an articulated joint 242 interconnecting the tractor portion 222 and the trailer portion 224.

The vehicle 220 is similar to the vehicles 20 and 120 in that it includes a pair of fenders 244 extending over and partially enclosing the front wheels 238 and a grille assembly 246. The fenders 244 are constructed substantially identically to the fenders 34 of the vehicle 20, and the grille assembly 246 is constructed substantially identically to the grille assembly 46 of the vehicle 20.

From the foregoing, it will be understood that by means of the present invention numerous advantages over the prior art are realized. Perhaps most importantly, the present invention provides a frame construction for mine vehicles and similar heavy duty applications which is extremely heavy duty in nature and is therefore adapted to withstand severe bending and torsion loads and is also adapted to absorb substantially continuous vibration and shock loads. By this means vehicles incorporating the invention are adapted for substantially continuous duty and do not require frequent maintenance or servicing, particularly insofar as the frame components of the vehicle are concerned. The use of the invention is further advantageous in that vehicles incorporating the invention are provided with extremely heavy duty fender and grille assemblies at the front end of the vehicle. By this means the vehicle is adapted to withstand relatively large scale collisions and other impacts without requiring any substantial amount of repair or other servicing.

Although particular embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:
1. A mine vehicle including:
  a pair of spaced apart, longitudinally disposed tubular structural members each extending substantially the entire length of the vehicle and having predetermined height and width dimensions;
  at least two spaced apart, transversely disposed generally I-shaped beams each comprising a generally vertically extending web and upper and lower generally horizontally extending flanges with the flanges extending beyond the ends of the webs to define generally C-shaped notches at the opposite ends of each beam,
  said flanges of the beams comprising upper and lower surfaces which are spaced apart by a distance substantially equal to the height dimension of the rectangular members;
  said flanges of the beams each extending beyond the ends of the webs of the beams by a distance substantially equal to the predetermined width dimension of the tubular members;
  said tubular structural members being received in the notches of the beams between the flanges thereof and engaging the ends of the webs and secured in said notches to define the frame of the vehicle;
  a grille assembly mounted at the front end of the frame of the vehicle and comprising:
    a pair of channel members each extending substantially vertically from one of the tubular structural members;
    a channel member extending transversely between the upper ends of the vertically extending channel members; and
    a pair of brace members each extending angularly downwardly and rearwardly between one of the vertically extending channel members and the rectangular tubular member situated thereunder;
    wheel means supporting at least a portion of the frame; said tubular structural members of the frame extending between the wheel means; and
  fender means mounted on the tubular structural members of the frame and at least partially enclosing the wheel means;
  said fender means being further characterized by:
    a length of sheet metal bent into a generally box-shaped configuration comprising a plurality of spaced apart corners;

a series of inwardly turned flanges extending along at least one side of the fender means and welded together at points corresponding to the corners thereof; and a plurality of reinforcing members each secured on the inside of the fender means at one of the corners and each welded to the adjacent portions of the inwardly turned flanges for reinforcing the corners of the fender means.

\* \* \* \* \*